United States Patent
Gopal et al.

(10) Patent No.: US 8,781,110 B2
(45) Date of Patent: *Jul. 15, 2014

(54) UNIFIED SYSTEM ARCHITECTURE FOR ELLIPTIC-CURVE CRYPTOGRAPHY

(75) Inventors: Vinodh Gopal, Westboro, MA (US); Erdinc Ozturk, Worcester, MA (US); Gilbert Wolrich, Framingham, MA (US); Wajdi K. Feghali, Boston, MA (US)

(73) Assignee: Intel Corporation, Santa Clara, CA (US)

(*) Notice: Subject to any disclaimer, the term of this patent is extended or adjusted under 35 U.S.C. 154(b) by 1438 days.

This patent is subject to a terminal disclaimer.

(21) Appl. No.: 11/772,163

(22) Filed: Jun. 30, 2007

(65) Prior Publication Data

US 2009/0003593 A1    Jan. 1, 2009

(51) Int. Cl.
| | |
|---|---|
| H04L 9/30 | (2006.01) |
| H04L 9/28 | (2006.01) |
| H04L 9/00 | (2006.01) |
| G06F 7/72 | (2006.01) |
| H04K 1/00 | (2006.01) |

(52) U.S. Cl.
USPC ............... 380/28; 380/30; 380/46; 708/490; 708/491; 708/492; 708/518; 708/523; 708/525

(58) Field of Classification Search
CPC ..... G06F 7/725; G06F 7/5324; G06F 9/3877; G06F 9/3885; G06F 9/3897; H04L 9/30; H04L 9/3066
USPC .......................................................... 380/28
See application file for complete search history.

(56) References Cited

U.S. PATENT DOCUMENTS

| | | | | | |
|---|---|---|---|---|---|
| 4,641,238 | A | * | 2/1987 | Kneib | 710/110 |
| 5,101,431 | A | * | 3/1992 | Even | 380/30 |
| 5,586,256 | A | * | 12/1996 | Thiel et al. | 710/100 |
| 5,752,068 | A | * | 5/1998 | Gilbert | 712/16 |
| 6,182,233 | B1 | * | 1/2001 | Schuster et al. | 713/400 |
| 6,704,871 | B1 | * | 3/2004 | Kaplan et al. | 713/192 |
| 6,748,410 | B1 | * | 6/2004 | Gressel et al. | 708/491 |
| 6,845,446 | B1 | * | 1/2005 | Fuller | 713/153 |
| 6,892,215 | B2 | * | 5/2005 | Freking et al. | 708/491 |
| 7,113,593 | B2 | * | 9/2006 | Dent et al. | 380/28 |
| 7,277,540 | B1 | * | 10/2007 | Shiba et al. | 380/28 |
| 7,346,159 | B2 | * | 3/2008 | Gura et al. | 380/28 |
| 7,353,364 | B1 | * | 4/2008 | Chong et al. | 712/215 |

(Continued)

OTHER PUBLICATIONS

Ors, Siddika Berna, et al. "Hardware implementation of an elliptic curve processor over GF (p)." Application-Specific Systems, Architectures, and Processors, 2003. Proceedings. IEEE International Conference on. IEEE, 2003,entire document, https://www.cosic.esat.kuleuven.be/nessie/reports/phase2/kulwp6-023-1.pdf.*

(Continued)

*Primary Examiner* — Luu Pham
*Assistant Examiner* — Ronald Baum
(74) *Attorney, Agent, or Firm* — Grossman, Tucker, Perreault & Pfleger, PLLC

(57) ABSTRACT

A system for performing public key encryption is provided. The system supports mathematical operations for a plurality of public key encryption algorithms such as Rivert, Shamir, Aldeman (RSA) and Diffie-Hellman key exchange (DH) and Elliptic Curve Cryptosystem (ECC). The system supports both prime fields and different composite binary fields.

20 Claims, 9 Drawing Sheets

(56) References Cited

U.S. PATENT DOCUMENTS

| | | | |
|---|---|---|---|
| 7,392,399 B2* | 6/2008 | Grohoski et al. | 713/189 |
| 7,508,936 B2* | 3/2009 | Eberle et al. | 380/30 |
| 7,519,833 B2* | 4/2009 | Henry et al. | 713/190 |
| 7,606,943 B2* | 10/2009 | Ramchandran | 710/4 |
| 8,587,336 B2* | 11/2013 | Sueyoshi et al. | 326/38 |
| 2002/0108059 A1* | 8/2002 | Canion et al. | 713/201 |
| 2003/0007636 A1* | 1/2003 | Alves et al. | 380/37 |
| 2003/0105949 A1* | 6/2003 | Master et al. | 713/100 |
| 2004/0049293 A1* | 3/2004 | Hadwiger et al. | 700/4 |
| 2007/0098153 A1* | 5/2007 | Nishikawa | 380/30 |

OTHER PUBLICATIONS

Leong, P., et al, "A microcoded elliptic curve processor using FPGA technology." Very Large Scale Integration (VLSI) Systems, IEEE Transactions on 10.5 (2002): 550-559, entire document, http://www.cse.cuhk.edu.hk/~phwl/mt/public/archives/papers/ecc_tvlsi02.pdf.*

A. Menezes, "Efficient Implementation", Handbook of Applied Cryptography, Chapter 14, 1997, pp. 591-634.

American National Standard for Financial Services, Accredited Standards Committee X9, Inc. Financial Services "The Elliptic Curve Digital Signature Algorithm (ECDSA)" X9.62—2005—Draft—Nov. 11, 2005, 163 pages.

M. Brown et al., "Software Implementation of the NIST Elliptic Curves Over Prime Fields", Lecture Notes in Computer Science; vol. 2020, Proceedings of the 2001 Conference on Topics in Cryptology: The Cryptographer's Track at RSA, Springer Verlang, 2001, pp. 250-265.

Certicom Corp., Standards for Efficient Cryptography, "SEC 1: Elliptic Curve Cryptography", Version 1.0, Sep. 20, 2000, 96 pages.

C.K. Koc et al., "Low-Complexity Bit_Parallel Canonical and Normal Basis Multipliers for a Class of Finite Fields", IEEE Transactions on Computers, 47(3):353-356, Mar. 1998.

* cited by examiner

UNIFIED SYSTEM ARCHITECTURE FOR ELLIPTIC-CURVE CRYPTOGRAPHY

FIELD

This disclosure relates to public key cryptography and in particular to elliptic curve cryptography.

BACKGROUND

Public key cryptography is typically used for secure communications over the Internet, for example, to distribute secret keys used in cryptographic algorithms. Public key cryptography is also used in digital signatures to authenticate the origin of data and protect the integrity of that data. Commonly used public key algorithms include Rivert, Shamir, Aldeman (RSA) and Diffie-Hellman key exchange (DH). The public key algorithm may be used to authenticate keys for encryption algorithms such as the Data Encryption Standard (DES) and the Advanced Encryption Standard (AES).

RSA and DH provide security based on the use of number theory. RSA is based on factoring the product of two large prime numbers. DH is based on a discrete logarithm for finite groups. Typically, public key systems use 1024-bit parameters for RSA and DH.

The Elliptic Curve Cryptosystem (ECC) is a relatively new public key algorithm that is based on the arithmetic of elliptic curves. ECC provides the same level of security as RSA and DH but uses parameters having fewer bits than parameters used by RSA or DH. For example, to authenticate an 80-bit key, 1024-bit parameters are recommended for the RSA and DH public key algorithms and 160-bit parameters are recommended for the ECC algorithm. For a 128-bit key 3072-bit parameters are recommended for the RSA and DS public key algorithms and 224-bit parameters are recommended for the ECC algorithm.

Elliptic curve cryptography (ECC) provides more security than traditional cryptosystems based on integer fields for much smaller key-sizes. It is very efficient from the perspectives of computes, power, storage and bandwidth to transmit keys. It scales much better than the traditional schemes and is therefore likely to gain more popularity with increased need for higher security strengths. Elliptic curves are algebraic/geometric objects that have been extensively studied by mathematicians. These curves can be applied to cryptography by suitably defining the underlying field and constraining the parameters such that the points on the curve form a Group (suggested in 1985 independently by Neil Koblitz and Victor Miller).

Elliptic curves for cryptographic applications are defined over prime fields (Galois Field Prime (GFP)) and binary fields (Galois Field Binary (GF2m)) GFP and GF2m both have a finite number of points that form a mathematical Group structure. The points can be operated on by special "addition" or "subtraction" operations. For any two points P1 and P2 in the group: P3=P1+P2 is defined. After point-addition has been defined, the basic building blocks of any cryptosystem are computations of the form Q=[k]P. The operation [k]P may be referred to as scalar point multiplication. This can be defined as P added to itself (k−1) times. Note that 1<=k<ord(P), where "ord" is defined as the order of the element of the group. Given P and [k]P, it is computationally infeasible to recover k.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
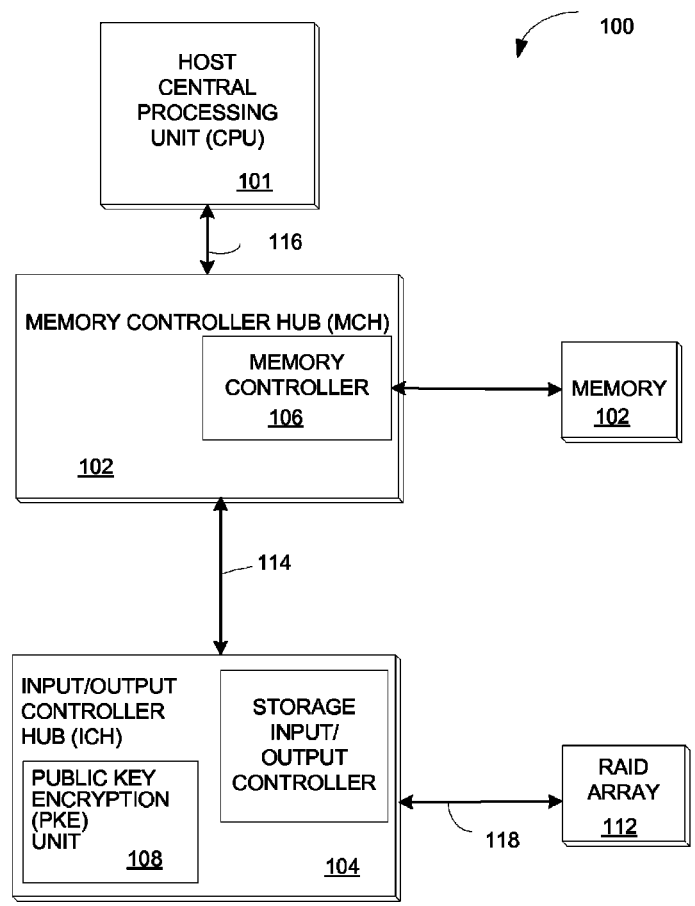
FIG. 1 is a block diagram of a system that includes an embodiment of a public key encryption (PKE) unit.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Federal Information Processing Standard (FIPS) 186-3 describes standard National Institute of Standards and Technology (NIST) elliptic curves. For example, there are standard NIST ECC curves for prime field sizes of 192, 224, 256, 384 and 521 bits and for binary field sizes of 163, 233, 283, 409 and 571 bits.

An ECC computation involves modular arithmetic operations on an elliptic curve over a finite field. A finite field consists of a finite set of elements. Modular addition and multiplication operations may be performed on pairs of field elements. There is one finite field containing q elements if and only if q is a power of a prime number. A prime finite field is a field with q=p, where p is an odd prime.

The elements of the prime finite field may be represented by the set of integers $\{0, 1, \ldots, p-1\}$ with addition defined as a+b=r mod p. The "mod p" refers to addition modulo p where r is the remainder when the integer a+b is divided by p. Multiplication is defined as a.b=s mod p.

Many of the standard NIST field sizes are not a multiple of 8-bits, for example, the NIST P-521 curve. Thus, in a system having a data path that is a multiple of 8-bits, multiple shift operations are required to align operands (a, b) and the result of modular multiplication.

For example, in a system having a 64-bit data path, the alignment of operands requires a significant amount of shifting, which uses a significant number of compute cycles. If the operands (a, b) of the modular multiplication are scaled to align the operands (a, b) to the 64-bit data path, the number of shift operations is reduced but the number of shift operations is still a significant percentage of the compute cycles.

For example, if operands A and B are both 300 bits, the product of A×B is 600 bits. In a system with a 64-bit data path, the 600 bit product is not aligned to a 64-bit word. This involves 24 (600–576) single-bit shift vectors in order to align to a 64-bit word which increases the number of compute cycles to perform modular multiplication.

As public-key systems such as RSA and DH use operands in the range of 1024-3072 bits, one significant challenge with Elliptic Curve Cryptography (ECC) is the fact that the field sizes are smaller than what is expected from other public key systems. A system that has been optimized to handle operands in the range of 1024-3072 bits may not perform well when presented with operations on operands 160 bits in length due the number of additional shift operations. Furthermore, even when a system is optimized for ECC, there are differences in the manner in which elliptic curves are defined over prime and binary fields.

An embodiment of a PKE unit according to the principles of the present invention provides an efficient unified solution to public-key systems such as RSA, DH and ECC and performs both prime and binary ECC operations.

The PKE unit has a generic 521-bit multiplier capability that does not tie the modular reduction step with the multiplication. For example, in contrast to Montgomery multiplier that computes A*B mod M and returns the final reduced result, the generic 521 multiplier only performs the multiply step alone and returns a result that is twice as large as the operand.

In an embodiment nine extra carry bits over a power-of-2 are provided to support different sized Karatsuba factorizations, Barrett reductions algorithms as well as the capability to support integer modulo multiplications with respect to Mersenne primes as large as 521 bits or generic moduli of up to 520 bits in length.

A Mersenne prime of 521 bits is $p=2^{521}-1$. Thus, A*B mod this prime may be easily reduced because A*B is a 1042 bit result. The 1042 bit result may be reduced back to a field-size of 521 by adding the low result and the high result. Thus, up to 521-bit operands are allowed for Mersenne primes. For regular moduli where reduction is performed by Barretts method, that mu has one extra bit than the operand-size for better precision. In order to multiply by mu, the operand sizes are limited to one less bit, that is, 520 bits for general moduli.

FIG. 1 is a block diagram of a system 100 that includes an embodiment of a Public Key Encryption (PKE) unit 108. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Xeon® processor, or Intel® Core® processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

Figure 2:
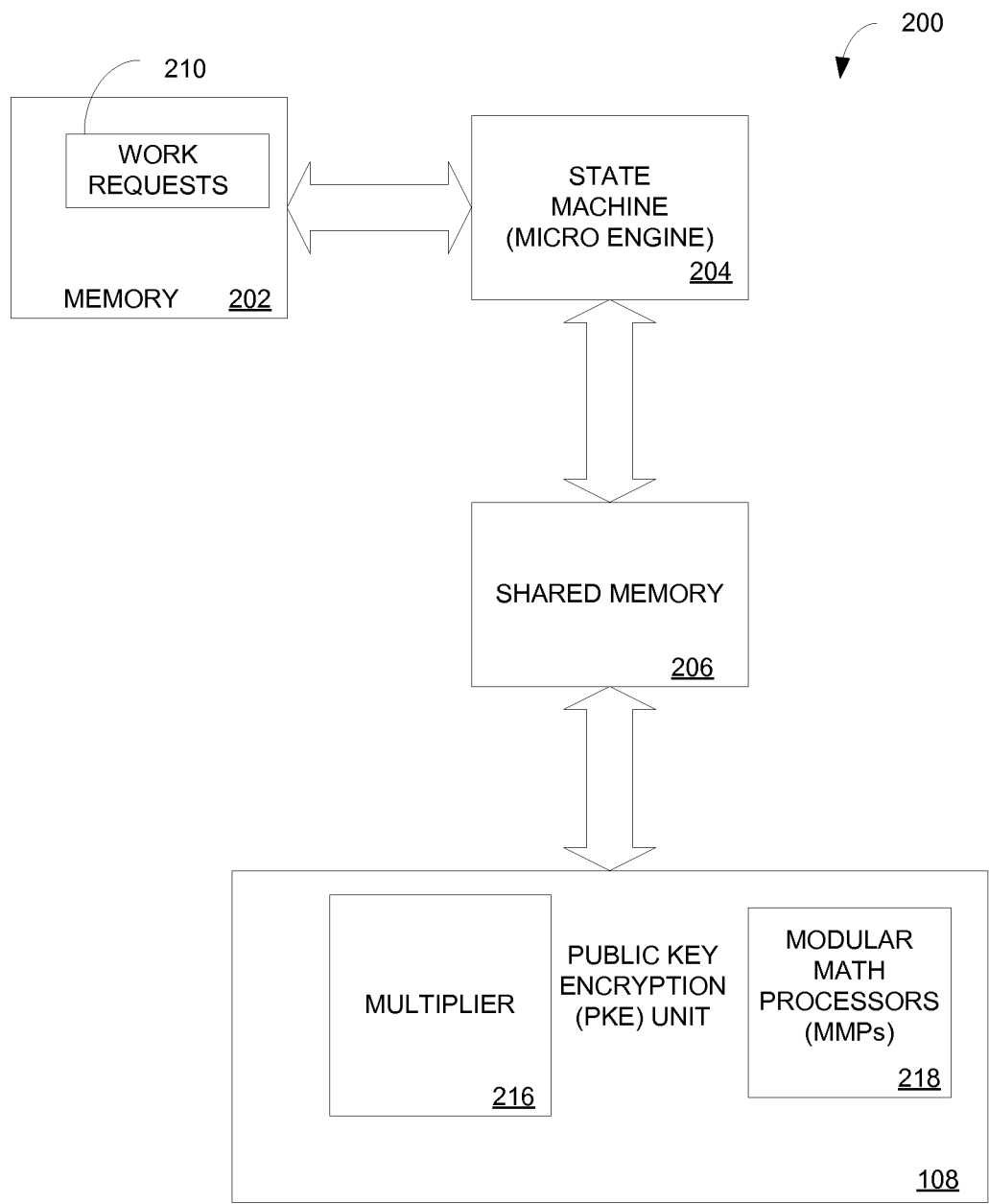
FIG. 2 is a block diagram of an embodiment of a system that includes the public key encryption (PKE) unit shown in FIG. 1.

FIG. 2 is a block diagram of an embodiment of a system 200 that includes the public key encryption (PKE) unit 108 shown in FIG. 1.

The system 200 includes a memory 202 for storing work requests 210 and a state machine (micro engine) 204 which processes the work requests 210. The state machine 204 issues instructions to the PKE unit 108 through a shared memory 206.

In one embodiment the state machine 204 may be one of a plurality of micro engines in a processor, for example, a micro engine in an IXP® 2400 processor available from Intel Corporation. The PKE unit 108 offloads computationally expensive operations from the state machine (micro engine) 204.

The memory 202 and the shared memory 206 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

Based on a work request 210 stored in memory 200, the state machine 204 may offload computationally expensive operations in Diffie-Hellman key exchange (DH), Digital Signature Algorithm (DSA) digital signature, Rivest, Shamir, Adleman (RSA) encryption/decryption and primality testing to the PKE unit 108.

The PKE unit 108 includes one or more modular math processors (MMP) 218 and multipliers 216. The PKE unit 208 may perform modular arithmetic on large numbers. An example of modular arithmetic is a modular exponential operation such as, $g^e$ mod m where g is the base, e is the exponent and m is the modulus.

Figure 3:
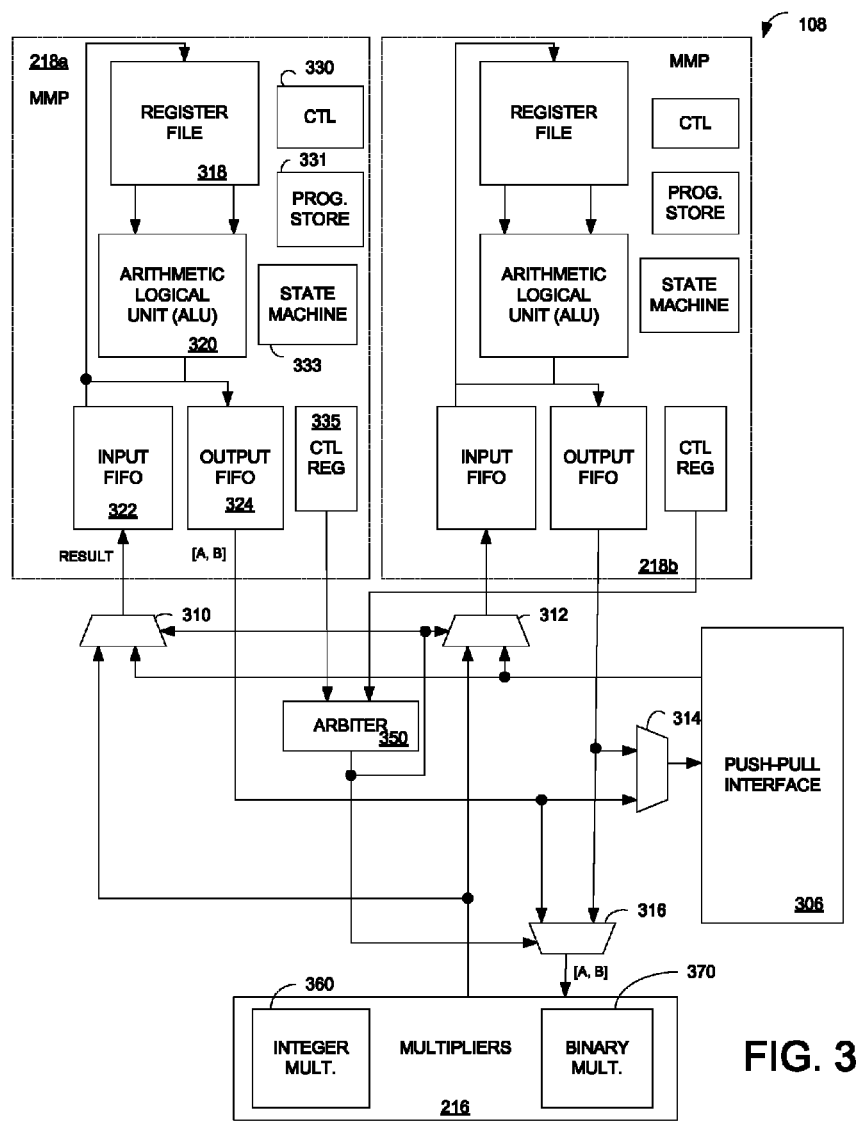
FIG. 3 is a block diagram of an embodiment of the PKE unit shown in FIG. 2 that includes a multiplier according to the principles of the present invention.

FIG. 3 is a block diagram of an embodiment of the PKE unit 108 shown in FIG. 2 that includes a multiplier according to the principles of the present invention. In the embodiment shown, the PKE unit 108 includes two modular math processors (MMPs) 218a, 218b. However, the PKE unit 108 is not limited to two MMPs 218a, 218b, in other embodiments, the PKE unit 108 may have more than two MMPs.

The PKE unit 108 performs computationally expensive mathematical computations such as modular exponentiation, division and greatest common divisor (gcd). The PKE unit 108 also includes multipliers 216, which is shared by the MMPs 218a, 218b.

Each MMP 218a, 218b includes a respective input First In First Out (FIFO) 322 and an output FIFO 324. The communication path through each MMP 218a, 218b is through the FIFOs 322, 324. Data is enqueued to the input FIFO 322 and dequeued from the output FIFO 324. The states of the MMPs 218a, 218b are independent from each other. Each MMP 218a, 218b may be concurrently transferring data to/from shared memory 206 (FIG. 2) through a push-pull interface 306.

The multipliers 216 may be accessed by the MMPs 218a, 218b via an internal PKE bus and an arbitration mechanism that includes multiplexers 310, 312, 314 and 316 and associated arbitration logic (arbiter) 350. As the multipliers 216 are shared by the MMPs 218a, 218b, the arbiter 350 controls which MMP 218a, 218b is currently using the multipliers 216.

The operand size for each MMP 218a, 218b is configurable through the control logic 330, program store 331 and state machine 333. In one embodiment the operand size may be configured to be 256 or 512 bits. The type of multiply operation is also configurable. In one embodiment, the type of multiply operation performed by the multipliers 216 for a particular MMP 218a, 218b may be unsigned integer or GF2 (carry-less). Based on the configured operand size and multiply operation for a particular MMP 218a, 218b, the MMP 218a, 218b operates on the required length result vectors without explicit command encodings. For example, the control store 330 of one of the MMPs 218a, 218b may be configured to perform scalar point multiplication for all prime field sizes less than 521 bits.

The control program store 330 stores code (instructions) that includes instructions for performing a multiply operation. While the MMP 218a, 218b is in run-mode, the MMP command state-machine 333 enqueues multiply operations in the output FIFO 324 for processing by the multipliers 216, with the type of multiply operations to be performed being dependent on the code stored in the control program store 331.

Various programs may be loaded into each MMP's respective control store 331. For example, a program for prime-fields that performs scalar point multiplication that works efficiently for all prime ECC sizes greater than 521 bits may be loaded into the control store 330 of the MMP 218a, 218b to perform ECC operations. A program for binary/Kobitz ECC curves that performs scalar point multiplication that works efficiently for all binary ECC sizes greater or equal to 512 bits may be loaded into the control store 330 of the MMP 218a, 218b to perform ECC operations.

Other programs that may be loaded into the control store 330 of the MMP 218a, 218b include programs for conversions from projective co-ordinate spaces to affine space for prime and binary ECC and programs for normal-polynomial basis conversions without requiring specialized normal-basis multiplier hardware for binary curves specified in normal basis.

The programs may be dynamically loaded into the control store 330 of the MMP 218a, 218b for any problem (operation), for example, DSA, RSA, DH, ECC-prime, or ECC-binary/Koblitz. The state machine 204 (FIG. 2) loads the program into the control store 330 intelligently by tracking the programs that are stored in the respective control store 330 of the MMPs 218a, 218b in order to avoid a reload of a program that is already stored in the control store 330.

In yet another embodiment, a work request 210 stored in memory 200 may be selected for processing by the PKE 108 based on program affinity with the programs that are already stored in MMPs 218a, 218b. The work requests 210 may be queued in a set of circular buffers that may also be referred to as rings. Program affinity merely means that I pick the next request based on the type of service.

For example, if there is a single ring of work-requests for the PKE 108, the state machine (micro engine) 204 may select the work request at the head of the circular queue to send to the PKE 108. However, this may result in a download of a program to the PKE 108 to perform operations for the work request. In an embodiment, the work request may be selected from the work queue in an intelligent manner. For example, if MMPs 218a, 218b are currently storing and executing programs to perform RSA1024 and DH2048, a portion of the entries at the head of circular queue, for example, 4-8 may be scanned to determine if any of the work requests are RSA1024 or DH2048 requests. If such a request is found, this work request can be scheduled next instead swapping out the program stored in the MMP program store for another program. In order to prevent starvation, the state machine (micro engine) 204 maintains a count of the number of times that the head of the circular queue has been passed over allows the work request at the head of the circular queue to be scheduled after a predetermined threshold number has been reached. For example, in an embodiment the maximum number of work requests scheduled ahead of the head of the queue may be eight.

The state-machine 333 operates on the required length result vectors without explicit command encodings based on the operations stored in the control store 330 and the operand size and type of multiply operation configured for the MMP 218a, 218b.

Thus, the computation of mathematical problem by the PKE unit 108 is split between the program stored in the program store 331 and the operations performed by the multiplier through the use of the FIFOs 322, 324 and the control register 335. Furthermore, program code for critical loops that perform the same function may be reused to compute different problems.

The multipliers 216 that are shared by the MMPs 218a, 218b include two independent multipliers, an integer multiplier 360 for performing integer multiplication operations and a binary multiplier 370 for performing binary multiplication. The multipliers 216 may operate in one mode (integer/binary) with MMP 218a and another mode with MMP 218b in an interleaved fashion with the selection of the mode of operation (binary/integer) being made prior to sending each problem to the multipliers 216.

For example, MMP 218a may be performing a binary ECC operation on binary field size of 233 bits, thus requiring the multipliers 216 to be configured for 256 bits, Galois Field ({256 b, GF*}) mode multiplication with the multiplication operation being performed by the binary multiplier 370. In GF mode, the binary multiplier 370 performs a GF carryless multiplication operation. MMP 218b may be operating on 384-bit prime field size, requiring the multipliers 216 to be set in 512 bit, integer ({512 b, int*}) mode. In integer mode, the integer multiplier 360 performs an integer multiply operation using unsigned integer multipliers in redundant form. The integer multiplication operation performed by the integer multiplier 360 and the GF carryless multiplication operations performed by the binary multiplier 370 are supported concurrently in an interleaved fashion for the respective MMP 218a, 218b that has exclusive access to the multipliers 216.

The GF "carry-less" multiplier hardware improves performance of binary ECC operations. Furthermore, each MMP 218a, 218b may be configured to perform one of a plurality of reduction techniques, such as, Barrett Reduction or Montgomery Reduction to perform scalar point multiplication.

Each MMP 218a, 218b has three modes of operation controlled by the MMP state machine 333: sleep, Input/Output (IO) and run. For example, when the MMP 218a is in sleep mode, MMP 218b may be initialized by loading control words into the control store 330. After the last control word is loaded into the control store 330, the MMP 218b transitions to I/O mode.

In IO mode, data is loaded into the MMP 218a, 218b by enqeuing it in the input FIFO 322. Results may be returned through the push pull interface 306 by writing them to the output FIFO 324.

When the MMP 218a, 218b is in run mode, the MMP 218a, 218b only communicates with the multipliers 216 to perform math operations. For efficient computation, one MMP 218a, 218b may be in run mode while the other MMP 218a, 218b is in IO/sleep mode.

The initialization procedure includes enqueuing three phases of data to the MMP's input FIFO 322. The first phase is a preamble that includes configuration information. In one embodiment, 128-bits of configuration information are sent to the MMP 218*a*, 218*b*. The second phase is a control store binary to be stored in program store 331 and executed by the MMP state machine 333. The third phase is the input data for use by the stored control store binary.

In the first phase, three 32-bit long words of preamble are loaded into the program store 331 through the push-pull interface 306. The preamble includes user defined fields (having one or more bits) that may be used to load constants and user-defined parameters separately from the program. The use of the preamble to separate constants and parameters from the program allows an optimal MMP dynamic library binary size. The preamble also includes an indication of the total number of quad words (64-bits) of control store to be loaded in the second phase. In one embodiment, the user defined bits are used to select a prime ECC size to be used by the program.

The order n of an ECC curve is the number of distinct points on the ECC curve, that is, n is the smallest integer that satisfies nG=point at infinity. Scalar point multiplication is performed through the use of point addition and point doubling. Point addition and point doubling requires a large number of shifting and multiply operations. When the order (n) of the ECC group is prime or when the order (n) of a point on the curve is known, performance of the scalar point multiplication operation is optimized by eliminating checks when performing point addition and point multiplication. For example, point doubling requires checking if $y_1=0$ and point addition requires checking if point $P_1$ is equal to point $P_2$.

In another embodiment, a user defined field in the preamble may be used to indicate whether a point has an order that is known. When n is prime, the order of Q is equal to the order of G, where Q=dG. Thus, when the order n of the ECC curve is known to be prime, a check to determine if the points to be added are equal is not required resulting in a reduction in computation time. Similarly when the user field indicates that the order of the group is known checking steps in the program to check for point at infinity and point equality are skipped. A user defined bit "point-order is known" when set allows all checks to be skipped. Thus, when the order of a point is known to be N is treated in the same way as a prime order, even when N is composite. All checks are performed only if the order of the point is unknown. The order of the point is unknown if the order of the group itself is unknown or the order of the group is non-prime and the order of a particular point in the group is not known.

When the MMP 218*a*, 218*b* is in run mode, the selected one of the multipliers 216 dequeues operands from the output FIFO 324. In an embodiment, there are two operands each having 512-bits that are enqueued side-by-side in the output FIFO 324. There is also a control register 335 that stores a Hold/Release indicator (for example, a single bit) per operand indicates whether the selected one of the multipliers 216 is to continue servicing that MMP 218*a*, 218*b* or to service a different MMP 218*a*, 218*b*. Thus, the Hold/Release indicator allows the MMPs 218*a*, 218*b* to share the multipliers 216.

The control register 335 may also store carry-bits per operand and an indication (for example, one bit) of the size of the multiplicand (256 or 512) and the operation type (int/GF2) per operand. Logically these appear to be part of the output FIFO 324. The MMP 218*a*, 218*b* makes a function call to the multiplier (MUL) symbolically as:

result=*MUL*(*A,B*,extra-carry-bits,hold/release,size, operation-type)

The operands A, B are stored in the output FIFO 324 and the extra-carry-bits, hold/release, size and operation-type indicators are stored in the control register 335 and read by the selected one of the multipliers 216. In an embodiment, the control information 330 may be written by the MMP 218*a*, 218*b* each time the MMP 218*a*, 218*b* queues a problem for the multipliers 216. The selected one of the multipliers 216 pulls the control information from the control register 335 for a problem and pulls the operands for the problem from the output FIFO 324.

In an embodiment, the multipliers 216 provide the functionality of a 515 by 515 multiplier with a throughput of one multiply operation per sixteen cycles (that is, 512 bits, 32 bits at a time). The arbiter 350 performs a combination of round-robin with efficient explicit "burst-mode" request grants based on program hints (for example, the hold/release bit (indicator)). This improves overall system throughput for a class of applications where co-operative use of the shared resource (multipliers 216) is possible.

The arbiter 350 allows requests to perform a multiply operation on operands (A,B) to be received from a single MMP 218*a*, 218*b* as long as the hold/release indicator in the control register 335 associated with a set of operands (A, B) for a particular problem is set to "hold". After an MMP 218*a*, 218*b* changes the hold/release indicator to "release", the arbiter 350 chooses another MMP 218*a*, 218*b* to service in round robin fashion based on the last MMP 218*a*, 218*b* to be serviced and the state of each MMP's respective hold/release indicator.

The multiplier may operate on 256-bit operands. However, as the multiplier always performs a fixed size multiply, this requires padding of the 256 Most Significant Bits (MSBs) of the operands with zeros.

In an embodiment, the MMP 218*a*, 218*b* is a 64-bit vector processor which is optimized to perform operations on arbitrarily large integers in the range of 64 to 4096-bits. It uses instruction words which are either sixteen or thirty-two bits long. In an embodiment, the register file 318 has two 2 kB data memory (for example, Random Access Memory (RAM)) for storing operands (A and B bank) and a 1 kB control store memory. The input FIFO 322 and the output FIFO 324 each are 0.25 kB. The MMP 218*a*, 218*b* also includes a general purpose ALU 320.

Figure 4:
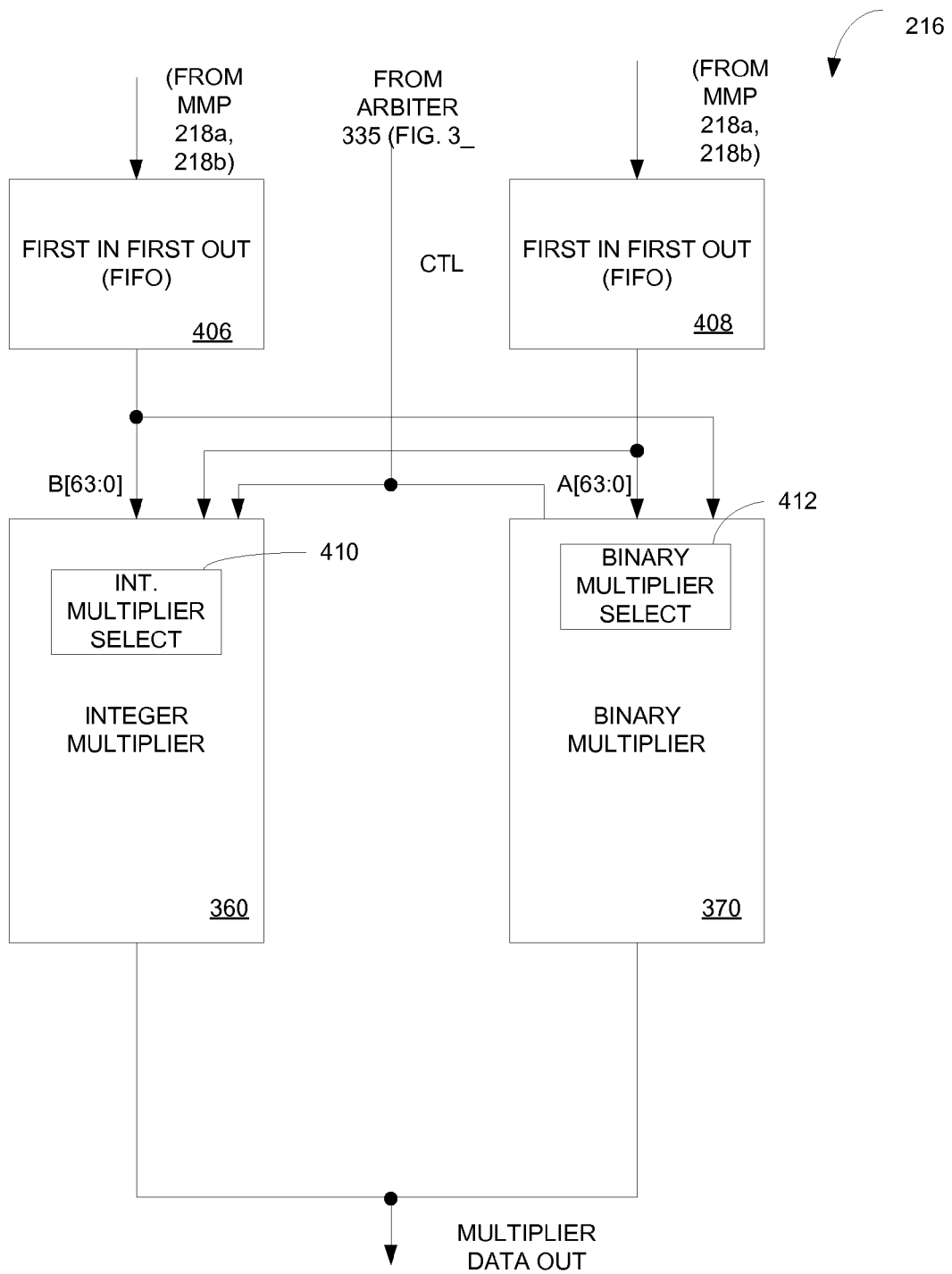
FIG. 4 is a block diagram of an embodiment of the multiplier shown in FIG. 3.

FIG. 4 is a block diagram of an embodiment of the multipliers 216 shown in FIG. 3. As shown, the multiplier includes an integer multiplier and a binary multiplier 370. The binary multiplier 370 is a Galois-field-2 (GF2) "carry-less" multiplier for performing binary ECC operations. The integer multiplier 370 is a "carry save" multiplier that includes at least one 64*64 carry save adder (CSA) multiplier. A CSA provides a result in redundant form, that is, partial sum bits and carry bits.

In an embodiment, the binary multiplier 370 includes a core GF2 64*64 multiplier. In another embodiment, the binary multiplier 370 includes a core GF2 32*32 multiplier. The core GF2 multiplier may support both 64*64 and 32*32 with one being selectable during an initialization time or may be dynamically modifiable during runtime. This carry-less 64*64 multiplier is independent from the CSA multiplier(s) in the integer multiplier 360. Each of the multipliers 360, 370 can therefore be optimized independently for the critical path.

Operands for multiply operations to be performed by the multiplier are dequeued from the output FIFO 324 in the MMP 218*a*, 218*b* that is currently in run mode and stored in FIFOs 406, 408. In an embodiment, each operand has sixteen-longword vectors that are stored in the output FIFO 324 in the MMP 218*a*, 218*b*.

There are a plurality of MMP instructions including an execute (exec) instruction and a FIFO_IN execute (fexec) instruction. The exec and fexec instructions specify source and destination operands and a hold/release indicator that when used in conjunction with the output FIFOs 324 in the MMP 218a, 218b indicates whether there will be more multiplications. This allows one MMP 218a, 218b to increase efficiency by bursting problems to the multipliers 216.

Whenever an operand is sent to one of the FIFOs as a result of the MMP executing an exec instruction, a hold/release (H/R) indicator is also enqueued. For example, in one embodiment, the hold/release indicator is a separate 1-bit FIFO per output FIFO that enqueues the H/R indicator that accompanies each operand that is enqueued by the exec instruction. The multipliers 216 are held by the current MMP 218a, 218b if the H/R indicator associated with either the A or B operand is set to hold. The H/R indicator may only be set/reset by an exec instruction execution in the MMP 218a, 218b.

When the MMP 218a, 218b is in run mode, the MMP 218a, 218b communicates solely with the selected one of the multipliers 216 and continues to "own" exclusive servicing of problems by the selected one of the multipliers 216 while the H/R indicator is set to "hold". In a system with at least two MMPs 218a, 218b, while one MMP 218a, 218b is in run mode with exclusive servicing of multiplication problems by the selected one of the multipliers 216, the other MMP 218a, 218b may be in IO/Sleep mode transferring data through the push-pull interface 306.

In an embodiment, the output FIFO 324 in the MMP 218a, 218b can store two operands to be operated on by the selected one of the multipliers 216 and the input FIFO 322 in the MMP 218a, 218b can store two results that are being received from the multipliers 216. The operands may be enqueued in the output FIFO 324 in the MMP 218a, 218b by an exec instruction.

In an embodiment, the multipliers 216 are 515 by 515 multipliers with a throughput of one multiply per sixteen cycles. The selected one of the multipliers 216 continues to pull multiply problems (requests) from a single MMP 218a, 218b as long as the hold/release indicator for the MMP 218a, 218b is set to "hold", for example, set to logic '1'. After the MMP 218a, 218b releases the multipliers 216 by changing the state of its respective hold/release indicator, the arbiter 335 chooses from the other MMPs 218a, 218b in round robin fashion. The arbiter 335 forwards indicators for the problem from the respective control register 335 of the MMP 218a, 28b to the multipliers 216. These indictors include an indication as to type of multiply operation (integer or binary multiplication) and the size of the multiplicand (256 or 512 bits).

The indicators are pulled by the multipliers 216 into multiplier select logic 410, 412. The integer multiplier 360 or the binary multiplier 370 is enabled dependent on the state of the type of multiplication operation (integer or binary) received from the control signals. Only one of the multipliers 360, 370 is enabled to perform the multiplication problem for the MMP 218a, 218b.

Figure 5:
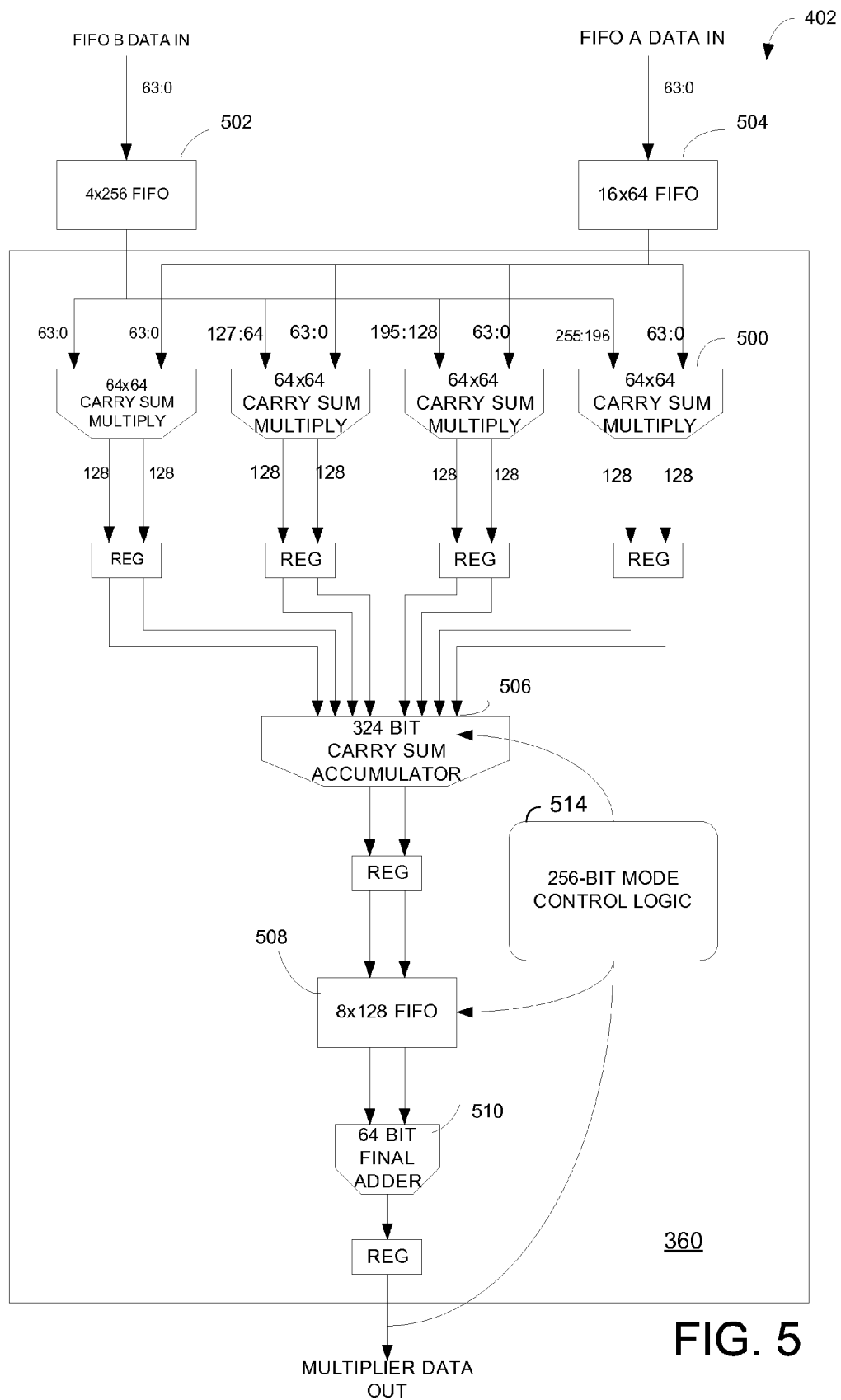
FIG. 5 is a block diagram of an embodiment of the integer multiplier shown in FIG. 4.

FIG. 5 is a block diagram of an embodiment of the integer multiplier 360 shown in FIG. 4.

The integer multiplier 360 includes four 67-bit carry save multipliers 500 and is configured to perform a 67 bit×259 bit multiply every clock cycle. The 515 bit operand data is written into the four 67-bit carry save multipliers 500 in 8 clock cycles. An integer multiplier state machine includes 256-bit mode control logic 514. The integer multiplier state machine drives decode logic used to generate the operand memory read addresses, clear and shift the accumulator result and generate the accumulator FIFO write. The 256-bit mode control logic 514 generates control signals to allow the integer multiplier 360 to perform 256-bit multiplication if requested through the state of the multiplicand for the problem.

The state machine waits for four quad words (operands) to be written into the input FIFOs 502, 504 before starting its first 256(4×64) bit×64 bit multiply. Thus, there is a four clock cycle minimum latency from when the first quad word is dequeued from the MMP output FIFOs 324 until the multiplier 360 can start the multiply operation.

The multiplier 360 performs a total of 16 259×67 bit multiplies and uses the carry save accumulator 506 to add the 16 partial products of these multiplies together from the 1030 bit result. The result of the carry save accumulator 506 is also in carry save format. The multiplier 360 computes the 1030 bit result least significant quad word first which requires alignment of the data through the use of shift operations (right by 64-bits). Result data is stored in the accumulator FIFOs 508. Data being read from the accumulator FIFOs 508 is also in carry save format. The carry and sum data is dequeued from the accumulator FIFO in fifteen 64-bit chunks and a final 70 bit chunk. The carry and sum values are then fed into a final 64 bit adder 510 that produces the final multiplier result that is returned to the input FIFO 322 of the MMP 218a, 218b.

Figure 6:
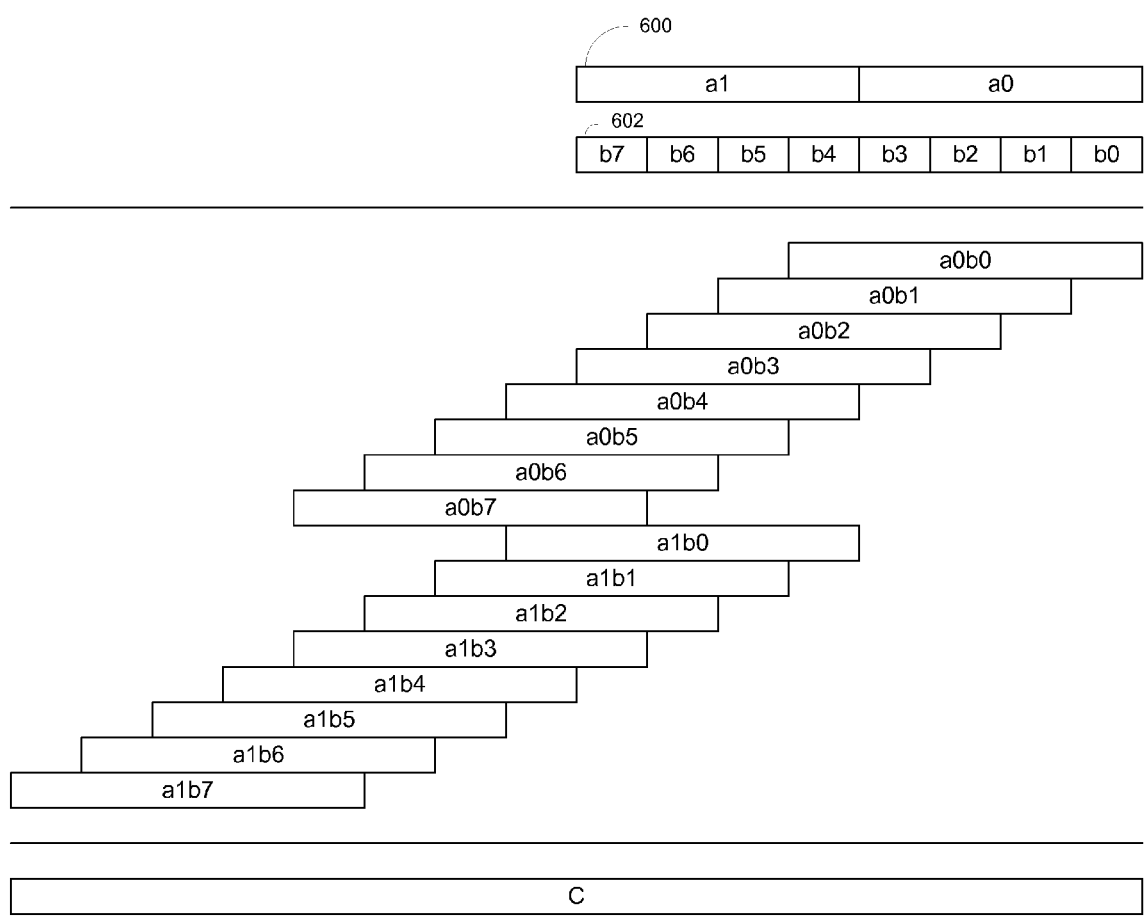
FIG. 6 is a block diagram illustrating a 512-bit multiplication by the integer multiplier shown in FIG. 5.

FIG. 6 is a block diagram illustrating a 512-bit multiplication by the integer multiplier 360 shown in FIG. 5. The CSA multipliers 500 produce products of the form $a_i{}^*b_j$ for a total of 16 partial products with each partial product being 320 bits in length. For example, if a 600 has 512-bits and b 602 has 512-bits, with 4 64-bit multipliers, a 256-bit portion of a may be multiplied by a 64-bit portion of b. The partial products are formed by multiplying the 256-bit portions of a, with one 64-bit portion b, with a having 2 256-bit portions labeled a0-a1 and b having 8 64-bit portions labeled b0-b7. The 16 partial products are computed as follows:

a0b0, a0b1, a0b2, a0b3, a0b4, a0b5, a0b6, a0b7
a1b0, a1b1, a1b2, a1b3, a1b4, a1b5, a1b6, a1b7

Figure 7:
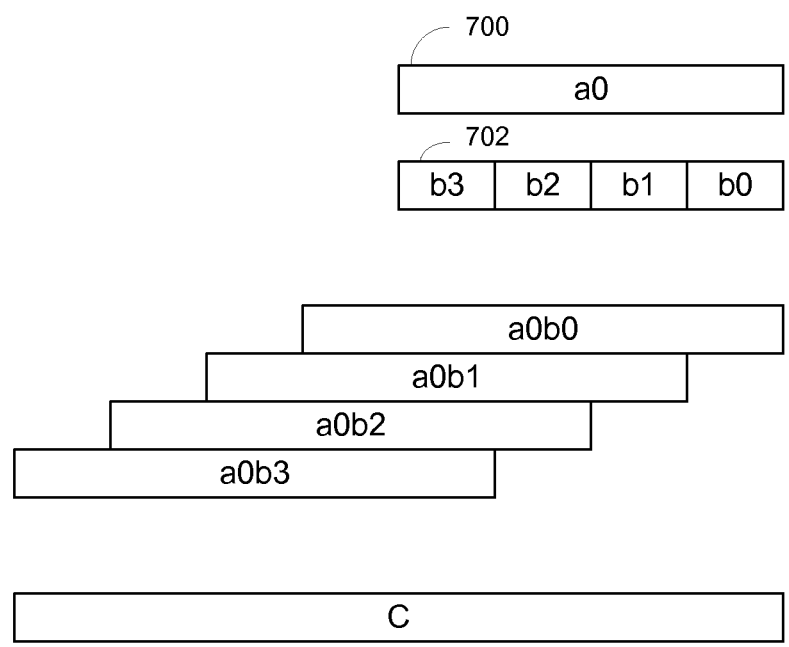
FIG. 7 is a block diagram illustrating a 256-bit multiplication by the integer multiplier shown in FIG. 6.

FIG. 7 is a block diagram illustrating a 256-bit multiplication by the integer multiplier 360 shown in FIG. 6. The CSA multipliers 500 produce products of the form $a_i{}^*b_j$ for a total of 8 partial products with each partial product being 320 bits in length. For example, if a 700 has 256-bits and b 702 has 256-bits, with 4 64-bit multipliers, a 256-bit portion of a may be multiplied by a 64-bit portion of b. The partial products are formed by multiplying the 256-bit portions of a, with one 64-bit portion b, with a 700 having one 256-bit portion labeled a0 and b 702 having 4 64-bit portions labeled b0-b4. The 4 partial products are computed as follows:

a0b0, a0b1, a0b2, a0b3.

Figure 8:
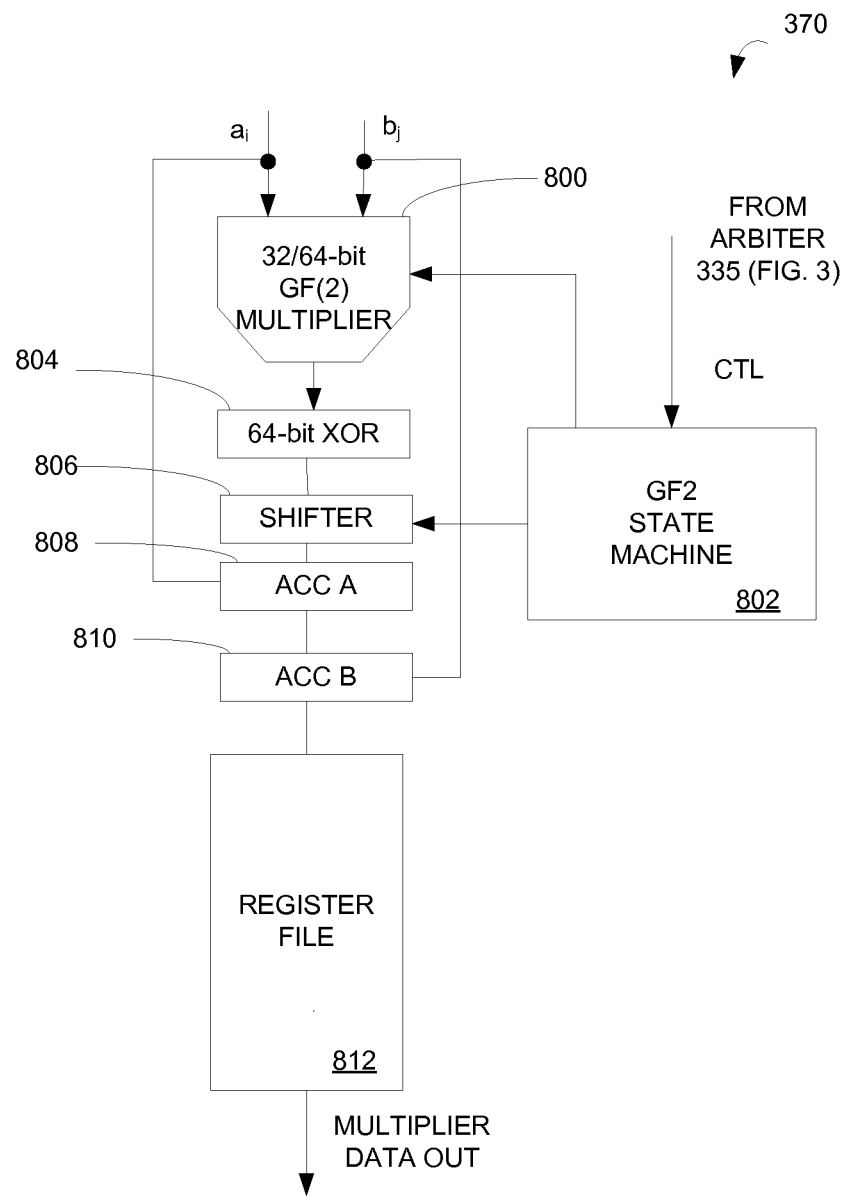
FIG. 8 is a block diagram of an embodiment of the binary multiplier shown in FIG. 4.

FIG. 8 is a block diagram of an embodiment of the binary multiplier 370 shown in FIG. 4. The binary multiplier 370 includes a GF2 multiplier 800 which may be a 32-bit or a 64-bit multiplier. In one embodiment, the size of the multiplier may be 32-bits in order to minimize area used by the GF2 multiplier 800. The binary multiplier 370 also includes 64-bit Exclusive OR (XOR) logic 804, shift logic 806, two accumulators (A and B) 808, 810, a register file 812 and a GF2 state machine 802.

In an embodiment, the GF2 multiplier 800 is a carry-less 64-bit multiplier with an input operand length of k bits. The GF2 multiplier may be constructed in a classical multiplier-array or as a further decomposition of karatsuba (KA) factors of some levels (m). The optimum number of levels (m) may be determined based on a critical path delay and area/gate count.

In one embodiment, the GF2 multiplier 800 is an array multiplier. A critical path delay for an array multiplier may be estimated as $\log_2 k$ XOR delays and one AND gate delay. The value of k is the number of bits in the operand. The delay is computed by weighing a 2-input XOR gate with a factor of 1.5 compared to an AND gate.

In another embodiment, the GF2 multiplier 800 is a KA variant of an array multiplier. A critical path delay of a KA variant multiplier may be estimated as $2 \text{ m}+\log_2 k$ XOR delays and 1 AND gate delay. The value k is the input operand length, for example, k=64 in an embodiment with a 64-bit operand.

The area used by the KA variant may be estimated as:

$$7\left(\frac{3^m}{2}-1\right)+3^m\left(\frac{k}{2^m}-1\right)^2 \text{ XOR gates and } 3^m\left(\frac{k}{2^m}\right)^2 \text{ AND gates.}$$

Based on these formulae, the optimal value for m for a KA variant of a GF2 multiplier for a 64-bit operand is 4. A KA variant with 4 levels of recursion requires only about half of the area of the array multiplier discussed earlier. However, the critical path delay of the KA variant is slower. For example, the critical path delay of the KA variant is 22 gate delays (14 XOR gates, 1 AND gates), while the array multiplier only requires 10 gate delays (6 XOR gates, 1 AND gate). Thus, the selection of whether to use the array multiplier or the Karatsuba variation may be dependent on the clock period if the critical path delay does not exceed the clock period. In an embodiment in which the critical path delay of the Karatsuba variation does not exceed the clock period, the Karatsuba version may be elected because is has the lower gate count.

In an embodiment in which the GF2 multiplier 360 is a 64-bit binary multiplier and the configuration mode specifies A, B as 256-bit operands, the product of A*B can be computed using classical multiplication using products of the form $a_i*b_j$ for a total of 16 partial products with each partial product being 128 bits in length. For example, in an embodiment in which the operand A has 256-bits and operand B has 256-bits, the partial products are formed by multiplying 64-bit portions of A and B, with A having 4 64-bit portions labeled a0-a3 and B having 4 64-bit portions labeled b0-b3. In one embodiment, the 16 partial products are computed as follows:

a0b0, a0b1, a0b2, a0b3
a1b0, a1b1, a1b2, a1b3
a2b0, a2b1, a2b2, a2b3
a3b0, a3b1, a3b2, a3b3

In another embodiment, the partial products may be computed column by column starting with column 0, by multiplying the portions i and j when i+j equals the column number. For example, the first partial product is computed by multiplying a0 by b0 where i=0 and j=0 and I+j=0. The other partial products are computed as follows:

Col 0: a0.b0
Col 1: a0.b1, b0.a1
Col 2: a1.b1, a0.b2, a2.b1
Col 3: a0.b3, a1.b2, a2.b1, a3.b0
Col 4: a1.b3, a2.b2, a3.b1
Col 5: a2.b3, a3.b2
Col 6: a3.b3

In another embodiment, Karatsuba multiplication may be used for a 2-level decomposition to produce 9 partial products with each partial product having 128 bits. In another embodiment, the product may be computed using one level of classical multiplication and one level of Karatsuba that generates 12 partial products with each partial product having 128 bits. In yet another embodiment, the columns are computed in descending order and the most significant words are shifted first because this operation is performed in "carry-less" fields.

Similarly, if A and B are 512 bit operands, then the GF2 state machine 802 may be setup in similar ways with one extra level of iteration. The tradeoff between KA and classical decomposition may be chosen based on the latency of the multiply operations and the size of the memory (register file 812) needed for storing partial products.

The type of binary multiplication is selectable through the GF state machine 802 by controlling how portions of the operands (A, B) are selected for the GF2 multiplier 800 and how partial products output from the 64-bit XOR 804 are shifted by the shifter 806.

Figure 9:
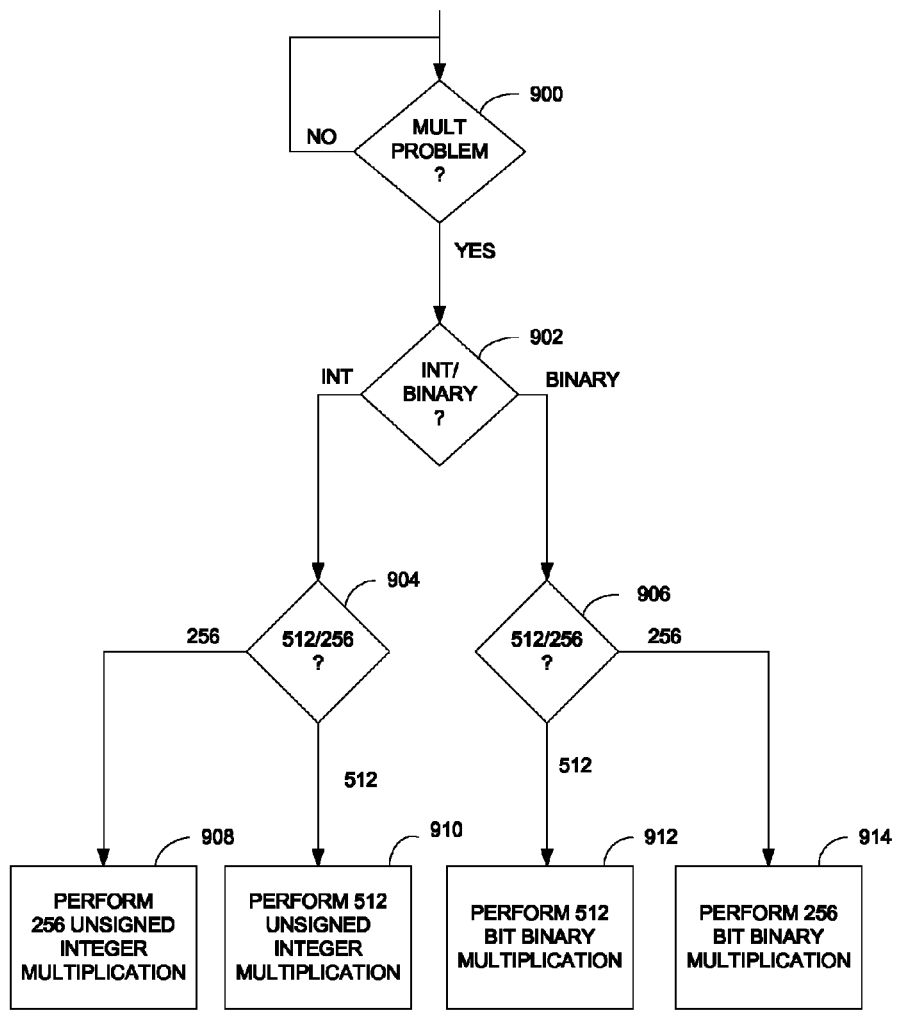
FIG. 9 is a flowgraph illustrating an embodiment of a method for performing binary or integer multiplication for a multiplication problem according to the principles of the present invention.

FIG. 9 is a flowgraph illustrating an embodiment of a method for performing binary or integer multiplication for a multiplication problem according to the principles of the present invention.

At block 900, if a multiplication problem is ready to be operated on by the multiplier 216, processing continues with block 902. If not, processing continues to wait for a multiplier problem to be downloaded to the multiplier 216.

At block 902, a multiplication type associated with the multiplication problem that is downloaded with the operands by the multiplier 216 indicates whether the multiplication operation to be performed is a binary multiplication operation or an integer multiplication operation. If the operation type indicates integer, processing continues with block 904. If the operation type indicates binary, processing continues with block 906.

At block 904, an operand type associated with the multiplication problem that is downloaded with the operands by the multiplier 206 indicates whether the operands are 512-bits or 256-bits. If the operand type indicates 256-bits, processing continues with block 908. If the operand type indicates 512-bits, processing continues with block 910.

At block 906, an operand type associated with the multiplication problem that is received with the operands by the multiplier 206 indicates whether the operands are 512-bits or 256-bits. If the operand type indicates 512-bits, processing continues with block 912. If the operand type indicates 256-bits, processing continues with block 914.

At block 908, the integer multiplier 360 performs unsigned integer multiplication using 256-bit operands.

At block 910, the integer multiplier 360 performs unsigned integer multiplication using 512-bit operands.

At block 912, the binary multiplier 370 performs binary multiplication using 512-bit operands.

At block 914, the binary multiplier 370 performs binary multiplication using 256-bit operands.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
a plurality of modular math processors, each modular math processor having a program store and a control register to store a configuration mode and a hold/release indicator;
a plurality of multipliers; and
an arbiter circuitry configured to control access to each of the plurality of multipliers by each of the plurality of modular math processors by choosing which of said modular math processors has access to the plurality of multipliers based at least in part on a last modular math processor to be serviced and a state of the hold release indicator of at least one of said plurality of module math processors, thereby allowing the sharing of the plurality of multipliers by the plurality of modular math processors, each of the plurality of multipliers configured to perform an unsigned integer multiply operation or a binary multiply operation for the plurality of modular math processors based on a program stored in the program store and on the configuration mode associated with the plurality of modular math processors, the configuration mode to identify a size of a multiplicand and operation type for a multiply operation; wherein said program comprises computer readable instructions which when executed by one or more of the modular math processors initiates scalar point multiplication for prime Elliptic Curve Cryptosystem (ECC) sizes greater than 521 bits.

2. The apparatus of claim 1, wherein the plurality of multipliers comprise:
a carryless multiplier to perform the binary multiply operation; and
a carry save multiplier to perform the unsigned integer multiply operation.

3. The apparatus of claim 2, wherein the binary multiply operation or the unsigned integer multiply operation is selected through the configuration mode.

4. The apparatus of claim 1, wherein the arbiter circuitry is further configured to allow a first modular math processor having a first configuration mode and a second modular math processor having a second configuration mode to share the plurality of multipliers in an interleaved fashion using a combination of round-robin with burst mode request grants based on a program hint provided by the first configuration mode and the second configuration mode.

5. The apparatus of claim 1, wherein the program is dynamically loaded into the program store.

6. The apparatus of claim 5, wherein a reload of the program stored in the program store is avoided by tracking programs already stored in the program store.

7. The apparatus of claim 5, wherein constants and user-defined parameters for the program are loaded separately from the program.

8. The apparatus of claim 7, wherein one of the user-defined parameters to allow skipping of checks in the program based on order of an ECC group.

9. The apparatus of claim 1, wherein a work request selected for one of the plurality of modular math processors based on programs that are stored in the program store.

10. A method comprising:
configuring a plurality of modular math processors, each modular math processor having a program store and a control register to store a configuration mode and a hold/release indicator;
selecting, with an arbiter, one of a plurality of modular math processor based on a program stored in the program store and at least in part on a last modular math processor to be serviced and a state of the hold release indicator of at least one of said plurality of module math processors, so as to allow a multiply operation to be forwarded to at least one of a plurality of multipliers shared by the plurality of modular math processors; wherein said program comprises computer readable instructions which, when executed by one or more of the modular math processors, initiates scalar point multiplication for prime Elliptic Curve Cryptosystem (ECC) sizes greater than 521 bits; and
performing, by the at least one of the plurality of multipliers, an unsigned integer multiply operation or a binary multiply operation based on the configuration mode associated with the selected one of the plurality of modular math processors, the configuration mode to identify a size of a multiplicand and operation type for a multiply operation.

11. The method of claim 10, wherein performing further comprises:
directing the binary multiply operation to a carryless multiplier in the plurality of multipliers; and
directing the unsigned integer multiply operation to a carry save multiplier in the plurality of multipliers.

12. The method of claim 10, wherein the arbiter is further configured to allow a first modular math processor having a first configuration mode and a second modular math processor having a second configuration mode to share the plurality of multipliers in an interleaved fashion using a combination of round-robin with burst mode request grants based on a program hint provided by the first configuration mode and the second configuration mode.

13. The method of claim 12, wherein the binary multiply operation or the unsigned integer multiply operation is selected through the configuration mode.

14. The apparatus of claim 10, wherein the program is dynamically loaded into the program store.

15. The method of claim 14, wherein a reload of the program stored in the program store is avoided by tracking programs already stored in the program store.

16. The method of claim 15, wherein constants and user-defined parameters for the program are loaded separately from the program.

17. The method of claim 16, wherein one of the user-defined parameters to allow skipping of checks in the program based on order of an ECC group.

18. A system comprising:
a dynamic random access memory to store data and instructions; and
a processor coupled to said memory to execute the instructions, the processor comprising:
a plurality of modular math processors, each modular math processor having a program store and a control register to store a configuration mode and a hold/release indicator;
a plurality of multipliers;
an arbiter circuitry configured to control access to each of the plurality of multipliers by choosing which of said modular math processors has access to the plurality of multipliers based at least in part on a last modular math processor to be serviced and a state of the hold release indicator of at least one of said plurality of module math processors, thereby allowing the sharing of the plurality of multipliers by the plurality of modular math processors, the plurality of multipliers configured to perform an unsigned integer multiply operation or a binary multiply operation for each of the plurality of modular math processors based on a program stored in the program store and on the configuration mode associated with each modular math processor, the configuration mode to identify a size of a multiplicand and operation type for a multiply operation; wherein said program comprises computer readable instructions which when executed by one or more of the multipliers initiates scalar point multiplication for prime Elliptic Curve Cryptosystem (ECC) sizes greater than 521 bits.

19. The system of claim 18, wherein the arbiter circuitry is further configured to: the arbiter circuitry is further configured to allow a first modular math processor having a first configuration mode and a second modular math processor having a second configuration mode to share the plurality of multipliers in an interleaved fashion using a combination of round-robin with burst mode request grants based on a program hint provided by the first configuration mode and the second configuration mode.

20. The system of claim 18, wherein the plurality of multipliers comprise:
   a carryless multiplier to perform the binary multiply operation; and
   a carry save multiplier to perform the unsigned integer multiply operation.

* * * * *